(12) United States Patent  
Saunders

(10) Patent No.: US 6,259,542 B1  
(45) Date of Patent: Jul. 10, 2001

(54) METHOD AND APPARATUS FOR MONITORING DISPERSIVE-WAVE ENERGY TO INDICATE AND OPTIMIZE SOLITON TRANSMISSION PERFORMANCE

(75) Inventor: Ross Alexander Saunders, Fife (GB)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/132,014

(22) Filed: Aug. 10, 1998

(51) Int. Cl.$^7$ .................................................. H04B 10/08
(52) U.S. Cl. ........................ 359/110; 359/161; 359/187
(58) Field of Search ................................ 359/110, 161, 359/173, 177, 187–188

(56) References Cited

U.S. PATENT DOCUMENTS

| | | | |
|---|---|---|---|
| 5,035,481 | 7/1991 | Mollenauer | 359/188 |
| 5,471,333 | 11/1995 | Taga et al. | 359/173 |
| 5,513,194 | 4/1996 | Tamura et al. | 372/6 |
| 5,530,585 | 6/1996 | Reid et al. | 359/344 |
| 5,579,428 | 11/1996 | Evans et al. | 385/124 |
| 5,602,949 | 2/1997 | Epworth | 385/37 |
| 5,612,808 | 3/1997 | Audouin et al. | 359/161 |
| 5,617,434 | 4/1997 | Tamura et al. | 372/6 |
| 5,625,479 | 4/1997 | Suzuki et al. | 359/135 |
| 5,737,110 | 4/1998 | Suzuki et al. | 359/161 |
| 5,737,460 | 4/1998 | Damen et al. | 385/24 |
| 5,767,998 | 6/1998 | Hasegawa et al. | 359/161 |
| 5,798,853 * | 8/1998 | Watanabe | 359/160 |

OTHER PUBLICATIONS

The Institute of Electrical Engineers, Letters, Aug. 17, 1995, vol. 31 No. 17, Control of Soliton–Soliton and Soliton–Dispersive Wave Interactions in High Bit–rate Communication Systems, pp. 1461–1463.

Optical Society of America, Optics Letters. Sep. 1, 1996, vol. 21 No. 17, Relaxation of Guiding Center Solitons in Optical Fibers, pp. 1351–1353.

Journal of Lightwave Technology, 5/97, vol. 15 No. 5, Reduction of Dispersive Waves by Chirping Compensation in an Optical Soliton Source with an Electro–Absorption Modulator, pp. 743–748.

Electronics Letters, Jun. 11, 1998, vol. 34 No. 12, Evaluation of Dispersive Waves in Soliton Pulses Generated from Mach–Zehnder Modulator and Singlemode Fibre pp. 1246–1247.

Physical Review E, 10/95, Part B, vol. 52 No. 4, Interaction of Solitons with a Strong Inhomogeneity in a Nonlinear Optical Fiber, pp. 4474–4481.

Optics Letters, Feb. 1, 1994, No. 3, Title: Suppression of noise accumulation in bandwidth–limited soliton transmission by means of nonlinear loop mirrors, pp. 183–185.

* cited by examiner

*Primary Examiner*—Kinfe-Michael Negash
(74) *Attorney, Agent, or Firm*—Oblon, Spivak, McClelland, Maier & Neustadt, P.C.

(57) ABSTRACT

An embodiment includes a gating device, a feedback device and a control device. Soliton pulses are received by the gating device, which detects and monitors a dispersive-wave between adjacent soliton pulses using a timing circuit. The timing circuit typically provides a gating signal offset in phase from the soliton pulses in order to trigger the gating device. Triggering the gating device allows the dispersive-wave to be accessed and monitored between adjacent soliton pulses. The feedback device, typically using detectors and processing circuitry, measures the energy of the soliton pulses and the energy of dispersive wave. The feedback determines a ratio of the energy levels as an indication of soliton-pulse transmission performance. The indication is provided to the control device as a feedback signal so that the control device can appropriately adjust characteristics of the soliton pulses and improve or optimize transmission performance.

24 Claims, 4 Drawing Sheets

METHOD AND APPARATUS FOR MONITORING DISPERSIVE-WAVE ENERGY TO INDICATE AND OPTIMIZE SOLITON TRANSMISSION PERFORMANCE

BACKGROUND OF THE INVENTION

The present invention relates generally to systems for monitoring soliton transmission performance within optical systems, and specifically to systems for monitoring transmission performance of soliton pulses within an optical transmission system by monitoring dispersive-wave energy relative to energy within the soliton pulses.

In optical transmission systems, certain optical effects are known to degrade the quality of transmission along standard transmission optical fiber in certain circumstances. Group-velocity dispersion is one of these optical effects and provides a limitation to quality transmission of optical signals across long distances. Group-velocity dispersion typically broadens an optical pulse during its transmission across long distances, which may lead to dispersion of the optical energy outside a time slot assigned for the pulse. Consequently, a trend in optical communications is toward the use of soliton pulses that maintain their pulse width over longer distances by balancing the effects of group-velocity dispersion with the nonlinear phenomenon of self-phase modulation. In this manner, the combined effect of group-velocity dispersion and self phase modulation effectively cancel each other when using soliton pulses. Those skilled in the art will be familiar with soliton pulses within optical transmission systems.

Additionally, one of the known advantages of using a soliton-pulse within an optical transmission system is that the soliton-pulse is robust to small perturbations as it propagates down an optical fiber. In other words, small temporal distortions, non-optimal group-velocity dispersion and small variations in power or pulse shape usually will not affect the stability of a soliton-pulse as it propagates down an optical fiber. Thus, it is theoretically possible for the soliton-pulse to travel an indefinite distance without degrading or changing its pulse shape.

However, there are some problems that may limit the useful transmission distance of soliton pulses within an optical transmission system. A known condition when using soliton pulses is that any non-solitonic pulse energy is essentially thrown out of the soliton-pulse and into what is conventionally called a dispersive wave. The dispersive-wave essentially operates as a photon "bin" for excess pulse energy outside a conventional soliton solution to the nonlinear Schrodinger wave equation. Those skilled in the art will understand that the nonlinear Schrodinger wave equation is a differential equation in the technical field of quantum mechanics governing optical fiber transmission of waves. As long as the dispersive-wave energy is not too large, the soliton pulse propagation may remain substantially undistorted and without significant soliton pulse to dispersive wave interaction. Thus, while the soliton-pulse propagates down the fiber, the energy level in a dispersive-wave may build up or increase due to the non-solitonic dispersive energy from any degradation of the soliton-pulse.

One problem that may be encountered when using soliton pulses is determining how to gauge or monitor the performance of transmitted soliton pulses as the pulses begin to degrade. Applicant has observed that when a series of soliton pulses (also known as a soliton-pulse stream) is transmitted or injected within an optical fiber, a dispersive-wave of non-solitonic energy appears between adjacent soliton pulses. In this manner, some dispersive-waves are essentially trapped between adjacent soliton pulses. For isolated soliton pulses, the dispersive-wave energy increases energy in the adjacent time slot representing a logical zero. In other words, the dispersive-wave energy reduces the extinction ratio (i.e., ratio of average optical power in a logical one to average optical power in a logical zero) when isolated soliton pulses are encountered. Furthermore, Applicant has discovered that conventional soliton transmission systems do not actively monitor the build up of such dispersive energy.

Patents and publications have described the existence of dispersive waves, their interaction with soliton pulses and how to compensate for dispersive degradations of soliton pulses. For example, U.S. Pat. No. 5,767,998 discloses a wavelength-division multiplexed optical transmission system utilizing optical soliton pulses. The '998 patent discloses optical amplifiers. When inserted into an optical fiber at predetermined intervals, the optical amplifiers compensate for loss in the fiber. Additionally, the '998 patent discloses eliminating any dispersive waves generated by soliton pulses and eliminating disturbance caused by soliton collisions by varying the fiber's dispersion characteristic in regions at and between the optical amplifiers.

U.S. Pat. No. 5,471,333 discloses another optical transmission system utilizing optical soliton pulses. The '333 patent discloses compensating for broadening of the soliton pulses by inserting an optical amplifier into an optical fiber and returning the soliton-pulse to its initial value. Furthermore, the '333 patent discloses controlling wavelength-dispersion values of the fiber in particular sections by using sections of fiber having dispersion values alternating larger and smaller than an average dispersion value meeting a predetermined soliton condition.

In an article authored by Pierluigi Franco, Michele Midrio, Marco Romagnoli, and Stefan Wabnitz entitled "Relaxation of Guiding Center Solitons in Optical Fibers" and published in Optics Letters, Vol. 21, No. 17 published on Sep. 1, 1996 (hereinafter "the Franco article"), the authors describe a resonance between optical amplifiers periodically located along an optical fiber link and soliton pulses leading to the generation of dispersive-wave energy. The dispersive-wave energy is disclosed in the Franco article to appear as sidebands to the soliton pulses. The Franco article further discloses how soliton perturbation theory still applies when strongly perturbed solitons appear in periodically amplified optical-fiber links.

In an article by R. J. Essiambre and G. P. Agrawal entitled "Control of Soliton-Soliton and Soliton-Dispersive Wave Interactions in High Bit-Rate Communications Systems" published by IEEE Electronic Letters, Vol. #31, No. 17 published on Aug. 17, 1995 (hereinafter "the Essiambre article"), the authors disclose that system performance of a soliton-based lightwave system is affected by the interaction between solitons and dispersive waves. The Essiambre article discloses that numerical simulations for high bit-rate (80 Gbit/s) soliton communication systems show that limiting factors include the growth of dispersive waves that interact with a soliton train of pulses. The Essiambre article also discloses that transmission distance can be increased by either inserting fast saturable absorbers or using synchronous modulators to control the soliton-to-dispersive-wave interaction.

SUMMARY OF THE INVENTION

In accordance with the invention as embodied and broadly described herein, in one aspect, a method is described for monitoring transmission performance of soliton pulses within the context of an optical transmission system. In general, the method begins by measuring an energy level of the soliton pulses and then accessing a dispersive-wave between adjacent soliton pulses. Typically, accessing the dispersive-wave is accomplished by providing a gating signal offset in phase from the soliton pulses and allowing the dispersive-wave through a gating device when the gating device receives the gating signal. Preferably, the gating signal is offset by approximately 180 degrees from the soliton pulses. The energy level of the dispersive-wave can then be monitored. Next, the energy level of the soliton pulses is compared with the energy level of the dispersive-wave to provide an indication of the soliton-pulse transmission performance.

Additionally, the method may also include providing a feedback signal related to the indication of the transmission performance and then altering a characteristic of the soliton pulses based upon the value of the feedback signal. For example, characteristics such as the power level, the dispersion, or the pulse shape may be altered to improve or optimize transmission of the soliton pulses.

In another aspect, an apparatus is described for monitoring transmission performance of soliton pulses within an optical transmission system. In general, the apparatus includes a gating device, a feedback device and a control device. The gating device has a pulse input for receiving the soliton pulses and can detect a dispersive-wave between adjacent soliton pulses. The gating device also has a detected output for providing access to the detected dispersive wave. Preferably, the gating device is an electro-absorptive modulator. The feedback device is connected to the detected output of the gating device and provides a feedback signal on a feedback output of the feedback device. The feedback signal, or more particularly stated, the value of the feedback signal is an indication of the transmission performance of the soliton pulses. The feedback signal, or more particularly stated, the value of the feedback signal is based upon a difference between or a ratio of an energy level of the soliton pulses and an energy level of the detected dispersive wave. The control device is connected to the feedback output of the feedback device and has a control input for receiving the feedback signal. In response to the feedback signal, the control device alters a characteristic of the soliton pulses, such as the power level, dispersion or pulse shape.

In yet another aspect, an apparatus is described for monitoring transmission performance of soliton pulses within an optical transmission system. The apparatus includes a gating device for detecting a dispersive-wave between adjacent soliton pulses, a series of detectors and a processing device. A first detector optically connects to an input of the gating device and can measure an energy level of the soliton pulses incident to the gating device. Typically, the measured energy level includes the energy of the soliton pulses and the dispersive wave as an average optical energy level of the stream of soliton pulses. A second detector optically connects to a detected output of the gating device and can monitor an energy level of the detected dispersive wave. The processing device is connected to both detectors. The processing device can determine a ratio of the energy level of the detected dispersive-wave to the energy level of the soliton pulses. The processing device can also generate a feedback signal having a value based upon the ratio and provide the feedback signal as an indication of the transmission performance of the soliton pulses.

The apparatus may also include a control device connected to the processing device. The control device may receive the feedback signal and, in response to receiving the feedback signal, may alter a characteristic of the soliton pulses, such as the power level, dispersion or pulse shape. Furthermore, the apparatus may also include a timing circuit (typically implemented as a clock recovery circuit) for triggering the gating device with a gating signal in between the adjacent ones of the soliton pulses. The gating signal may be offset from the adjacent soliton pulses, typically by approximately 180 degrees.

BRIEF DESCRIPTION OF THE DRAWINGS

The accompanying drawings, which are incorporated in and constitute a part of this specification, illustrate embodiments of the invention, and together with the description, explain the advantages and principles of the invention.

Figure 1:
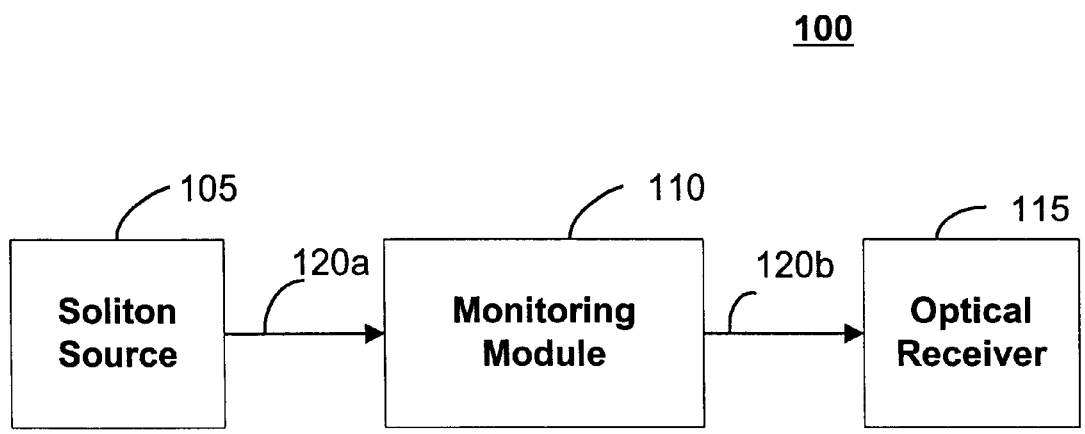
FIG. 1 is a block diagram illustrating an optical transmission system consistent with an embodiment of the present invention.

It is to be understood that both the foregoing general description and the following detailed description are exemplary and explanatory only and are not restrictive of the invention, as claimed. The following description, as well as the practice of the invention, set forth and suggest additional advantages and purposes of this invention.

DETAILED DESCRIPTION OF THE PREFERRED EMBODIMENTS

Reference will now be made to various embodiments according to this invention, examples of which are shown in the accompanying drawings and will be obvious from the description of the invention. In the drawings, the same reference numbers represent the same or similar elements in the different drawings whenever possible.

It is known that soliton pulses are special types of pulses theoretically capable of indefinite transmission distance without the need for further pulse shaping. In reality, the usable transmission distance of a series of soliton pulses is not quite infinite. Applicant has discovered that when a series of soliton pulses are transmitted within an optical fiber, a dispersive-wave of non-solitonic energy appears between adjacent soliton pulses and is essentially trapped between adjacent pulses. Such a dispersive-wave of energy is trapped if the power, dispersion or pulse shape does not precisely satisfy the nonlinear Schrodinger wave equation. Monitoring systems consistent with the present invention have a gating device that detects and monitors the dispersive-wave between adjacent soliton pulses. The energy level of the dispersive-wave is typically detected, monitored, and then compared relative to the energy in the soliton pulses. Such a comparison or ratio of the energy levels (e.g., the ratio of the dispersive-wave energy level to the energy level of the soliton pulses) serves as a good indication of transmission performance of the soliton pulses. In this manner, a substantially real-time indication of soliton-pulse transmission performance can be advantageously provided within an optical transmission system.

Additionally, Applicant has discovered that such an indication of soliton-pulse transmission performance can be used to improve or optimize how the soliton pulses are propagating along the fiber. In accordance with an embodiment of the present invention, a feedback signal is typically generated and provided by a feedback device based upon the comparison of dispersive-wave energy relative to soliton-pulse energy. Depending upon the value of the feedback signal, a characteristic of the soliton pulses is altered. For example, the characteristic may include one or a combination of the power level of the soliton pulses, the dispersion of the soliton pulses, or the pulse shape of the soliton pulses. By altering such a characteristic of the soliton pulses, the transmission performance of the soliton pulses may be advantageously improved or optimized to a desired value. In this manner, the transmission distance before soliton-dispersive wave interactions degrade performance is advantageously increased.

Figure 2:
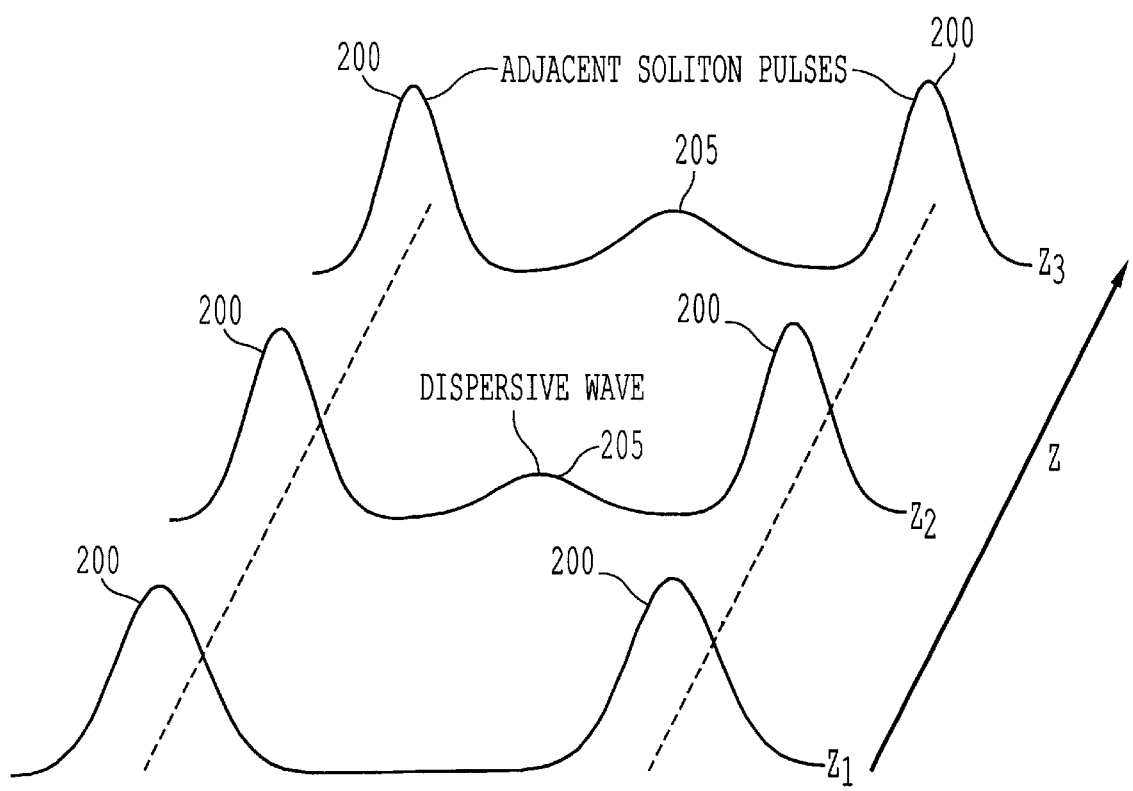
FIG. 2 is a diagram illustrating relative energy levels of adjacent soliton pulses and a growing dispersive-wave consistent with an embodiment of the present invention.
Figure 3:
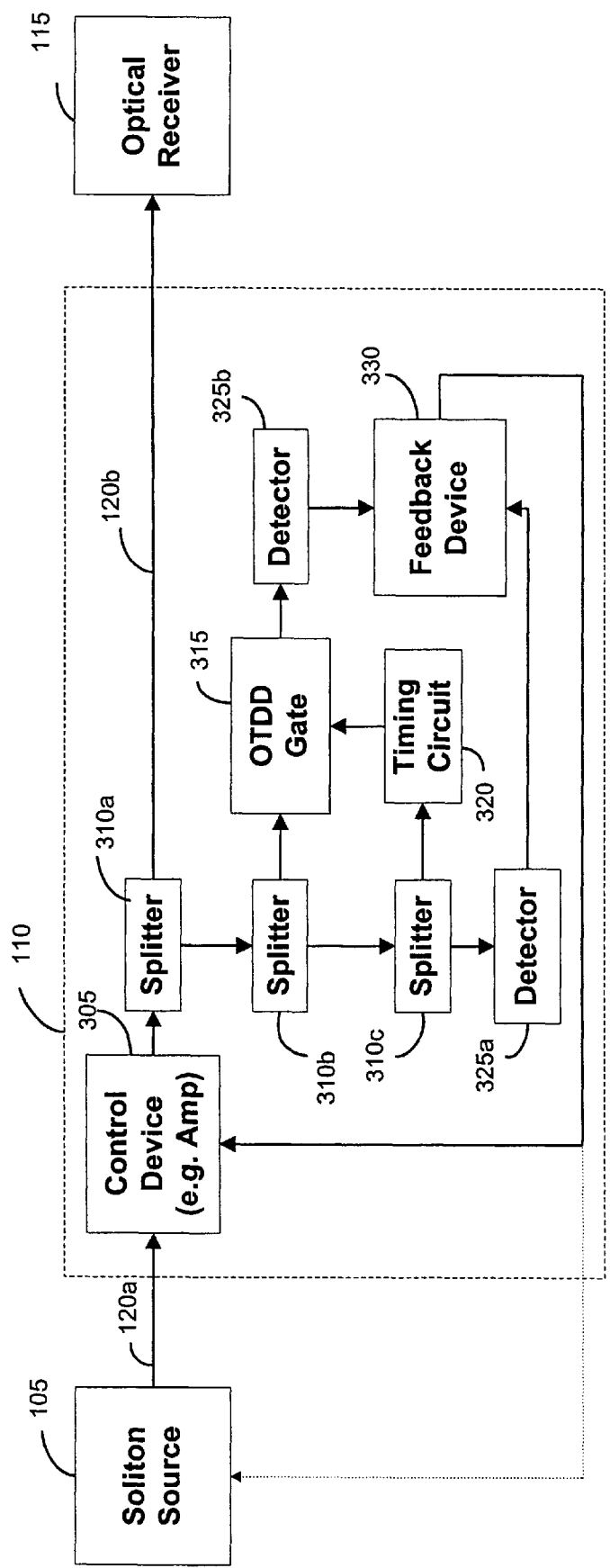
FIG. 3 is a more detailed block diagram illustrating an apparatus for monitoring transmission performance of soliton pulses consistent with an embodiment of the present invention.
Figure 4:
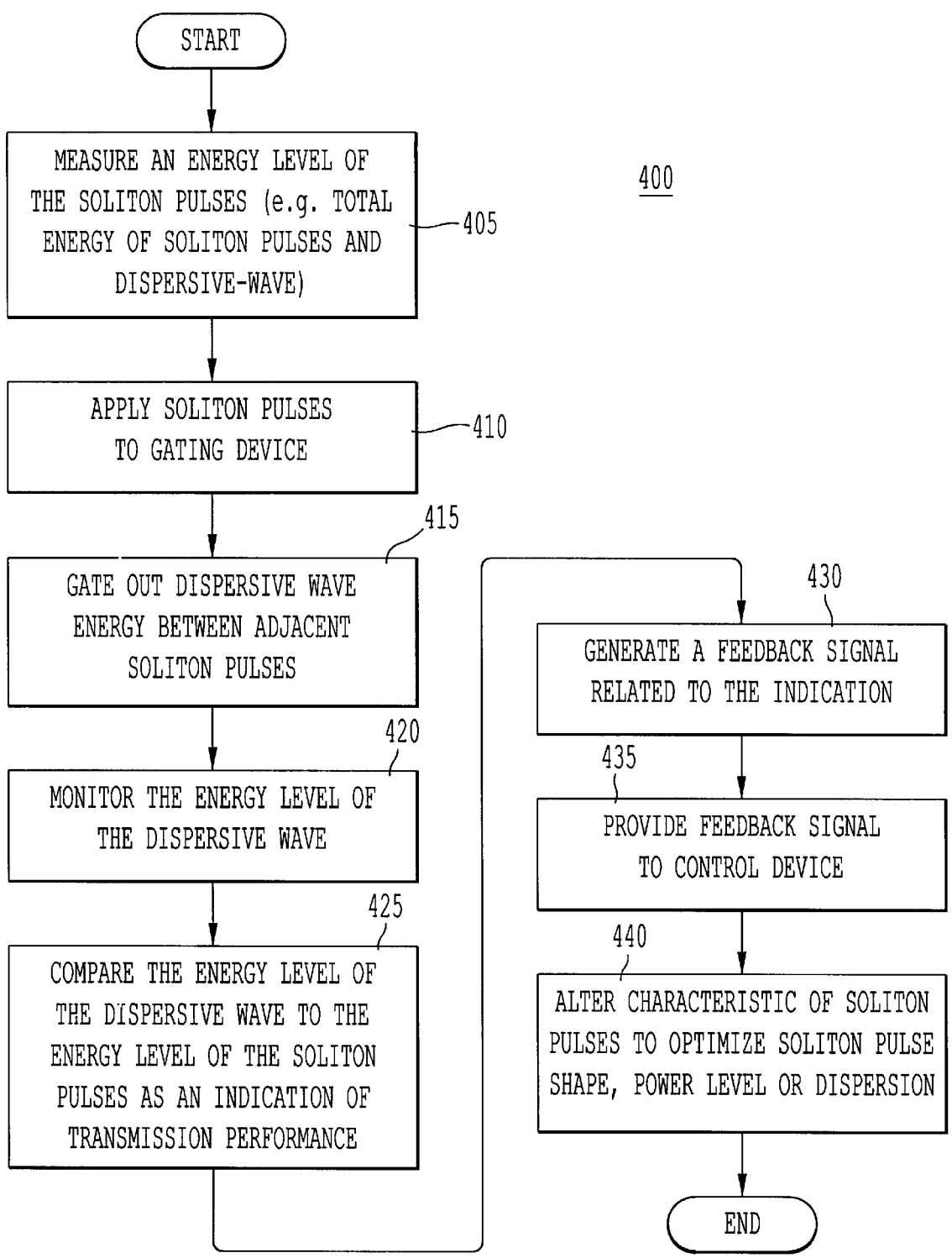
FIG. 4 is a flow diagram illustrating steps for monitoring transmission performance of soliton pulses consistent with an embodiment of the present invention.

In summary, FIG. 1 is a block diagram illustrating an operating environment for an embodiment of the present invention. FIG. 2 graphically illustrates the growth of a dispersive-wave between adjacent soliton pulses as they propagate within the optical transmission system of FIG. 1. FIG. 3 illustrates a monitoring and feedback portion of the optical transmission system of FIG. 1 in more detail. FIG. 4 illustrates steps from an exemplary method for monitoring transmission performance of soliton pulses in accordance with an embodiment of the present invention.

As shown in FIG. 1, according to an embodiment of the present invention, an optical transmission system 100 is illustrated that transmits soliton pulses from an optical source to a receiver. In general, the optical transmission system 100 includes a soliton source 105, at least one monitoring module 110 and an optical receiver 115. Optical fiber 120a is used within optical transmission system 100 to link soliton source 105 to monitoring module 110. Likewise, optical fiber 120b is used to link monitoring module 110 to optical receiver 115.

Soliton source 105 is capable of generating a stream or train of soliton pulses, preferably at a relatively high data rate, such as 10 Gbit/s. The soliton pulses generated by soliton source 105 are injected into fiber 120a leading to monitoring module 110. Although not shown, soliton source 105 may include multiple transmissions or conversion devices for transmitting a plurality of channels in a soliton wavelength-division-multiplexing system for apparatus 100.

In general, monitoring module 110 monitors transmission performance of the soliton pulses and adjusts characteristics of the soliton-pulse train in order to improve or optimize soliton transmission performance. More particularly, monitoring module 110 detects and monitors a dispersive-wave between each of the adjacent soliton pulses. Additionally, monitoring module 110 determines the relative difference or ratio between a detected energy level of the soliton pulses and a detected energy level of the dispersive wave. The relative difference or ratio is an indication of the transmission performance of the soliton pulses.

Furthermore, monitoring module 110 is also able to use this indication of transmission performance to adjust, alter or optimize characteristics of the soliton pulses as they propagate through monitoring module 110 toward optical receiver 115. In this manner, optical transmission system 100 can advantageously operate over fiber optics links, such as conventional Inter Exchange Carrier (IEC) fiber links, which have varying or unknown values of link dispersion, fiber loss and length. Additional features of monitoring module 110 will be described below in more detail with regard to FIG. 3.

Typically, monitoring module 110 is directly connected to optical receiver 115 without the need for fiber 120b. Additionally, it is contemplated that other embodiments of the present invention may also include one or more optical amplifiers (not shown) or one or more adjustable dispersion compensation devices (not shown), collectively referred to as control devices, as part of fiber 120a. In this manner, monitoring module 110 may provide feedback to one or more of such control devices and soliton source 105 in order to monitor and optimize the soliton-pulse transmission performance.

While optical transmission system 100 illustrated in FIG. 1 shows only one monitoring module 100, other embodiments of the present invention may use more than one monitoring module 100 periodically spread along the fiber route. With more than one monitoring module 100, the monitoring modules may be chained together in a series utilizing sections of optical fiber. In such a series configuration, multiple monitoring modules provide the ability to monitor and adaptively optimize the soliton-pulse transmission performance at multiple points between soliton source 105 and optical receiver 115 and decrease soliton-dispersive wave interactions.

As adjacent soliton pulses propagate within an optical fiber, such as fiber 120a, Applicant has discovered that dispersive energy may become trapped between the adjacent soliton pulses. Isolated soliton pulses shed dispersive-wave energy, but this energy is not trapped. Instead, the dispersive-wave energy increases the level of energy within the time slot for the adjacent logical zero, hence reducing the extinction ratio and degrading system transmission performance. FIG. 2 is a diagram illustrating a pair of exemplary adjacent soliton pulses within a series of soliton pulses as the pulses propagate down an optical fiber.

As shown in FIG. 2, adjacent soliton pulses 200 are illustrated as they propagate in direction Z within an optical fiber, such as fiber 120a from FIG. 1. More particularly, the pair of adjacent soliton pulses 200 are illustrated at three different transmission distances ($Z_1$, $Z_2$, and $Z_3$) from a light source as adjacent soliton pulses 200 propagate downstream within the optical fiber in direction Z away from the light source.

At a first transmission distance $Z_1$ closest to the light source, adjacent soliton pulses 200 appear to have acceptable transmission performance because there is no dispersive energy between adjacent soliton pulses 200. In an example from FIG. 1, the first transmission distance $Z_1$ may be representative of the point where adjacent soliton pulses 200 have just been injected into fiber 120a at soliton source 105.

At the next transmission distance $Z_2$, the same adjacent soliton pulses 200 appear. In the example from FIG. 1, this next transmission distance $Z_2$ may be representative of the point where adjacent soliton pulses 200 are propagating in fiber 120a mid-way between soliton source 105 and monitoring module 110. However, at transmission distance $Z_2$, some dispersive non-solitonic energy appears between adjacent soliton pulses 200.

Essentially, the dispersive non-solitonic energy is excess pulse energy that no longer fits within the soliton solution to the nonlinear Schrodinger wave equation. According to the nonlinear Schrodinger wave equation as described in the Franco article, such excess energy is shed from the soliton-pulse as the soliton-pulse continually reshapes itself during propagation. Thus, the dispersive non-solitonic energy appears as a dispersive-wave 205 between adjacent soliton pulses 200.

At the final transmission distance $Z_3$, the same adjacent soliton pulses 200 and dispersive-wave 205 are again present. In the example from FIG. 1, this final transmission distance $Z_3$ may be representative of the point where adjacent soliton pulses 200 have propagated through fiber 120a and are about to enter monitoring module 110. Due to the transmission distance over which adjacent soliton pulses 200 traveled, additional dispersive non-solitonic energy has fallen out of the solitons 200 and into dispersive-wave 205. As shown in FIG. 2, the energy level of dispersive-wave 205 at transmission distance $Z_3$ has increased relative to the energy level of adjacent soliton pulses 200. As the energy level of dispersive-wave 205 increases relative to the energy level of adjacent soliton pulses 200, the transmission performance of the soliton pulses diminishes. Accordingly, a difference between these respective energy levels or a ratio of these respective energy levels operates as an indicator of the transmission performance of the soliton pulses.

In the context of the above-described adjacent soliton pulses 200, the dispersive-wave 205 between such pulses and the illustrations in FIG. 2, an embodiment of the present invention within an optical transmission system may be described. FIG. 3 is a more detailed block diagram of such an optical transmission system, which includes an apparatus for monitoring transmission performance of soliton pulses consistent with an embodiment of the present invention.

As shown in FIG. 3, an embodiment consistent with the present invention includes soliton source 105, which provides a soliton-pulse stream to monitoring module 110. In this embodiment, monitoring module 110 includes a control device 305 optically responsive to a series of detection and monitoring components. Control device 305 is an optical or electro-optical device capable of altering one or more characteristics of the soliton pulses in order to improve transmission performance of the pulses. For example, such characteristics may include the power level of the soliton pulses, the dispersion of the soliton pulses or the pulse shape of the soliton pulses. In an exemplary embodiment, control device 305 may be an optical amplifier with an adjustable gain or an adjustable dispersion compensator. An example of an adjustable dispersion compensator suitable for use in an exemplary embodiment of the present invention is a conventional Bragg grating. Those skilled in the art will know of various other conventional devices suitable for adjusting the dispersion of a soliton pulse.

The detection and monitoring components include a series of optical splitters 310a–c, a gating device 315, a timing circuit 320, several detectors 325a–b and a feedback device 330. Essentially, once the soliton pulses pass through control device 305, the soliton-pulse stream is sampled or split several ways by splitters 310a–c in order to monitor the transmission performance of the soliton pulses. Splitters 310a–c essentially provide the soliton pulses to a pulse input of gating device 315, timing circuit 320 and one of the detectors 325a.

In general, the detector 325a essentially measures an energy level of the soliton pulses. In an exemplary embodiment, the detector 325a is a low bandwidth photodiode used for measuring average optical power. Furthermore, in an embodiment of the present invention, the measured energy level may include the energy of the soliton pulses along with the energy of the dispersive wave as an average optical power of the stream of soliton pulses.

Upon receiving the soliton pulses, timing circuit 320 (called a clock recovery circuit in some embodiments of the present invention) extracts a gating signal from the soliton pulses. In general, the gating signal provides an indication of the time period between adjacent soliton pulses 200 during which dispersive-wave 205 may appear. In an exemplary embodiment of the present invention, the gating signal is implemented as a 10 GHz clock signal extracted from a 10 Gbit/sec soliton pulse stream. The gating signal is provided to a timing input of gating device 315 as a trigger. Typically, the gating signal is out of phase (preferably by approximately 180 degrees) with the incoming soliton pulses. In this manner, gating device 315 may be triggered by the gating signal between adjacent soliton pulses so that the "through" state of the gating device 315 is typically 180 degrees out of phase with the incoming soliton pulses. This allows gating device 315 to provide access to dispersive-wave 205 between adjacent soliton pulses 200. In the exemplary embodiment, gating device 315 is implemented as an optical gating device such as an electro-absorptive modulator, an electro-optic modulator or a nonlinear optical loop mirror. In the exemplary embodiment of the present invention, the gating device is a Model Number 28976 Lithium Niobate ($LiNbO_3$) integrated electro-optic modulator manufactured by Pirelli Corporation. Other embodiments of the present invention may use electro-absorptive modulators manufactured by Alcatel Corporation.

If the soliton pulses have been perturbed from a desired transmission performance level (e.g., no longer at a desired or optimum value of power level, pulse width, pulse shape, or dispersion), dispersive-wave energy will appear at a detected output of gating device 315. The dispersive-wave or a signal provided by gating device 315 representative of the dispersive-wave energy is then detected by detector 325b. Typically, detector 325b is a low bandwidth photodiode. In this manner, the energy level of dispersive-wave 205 may be monitored for average power level or instantaneous power level.

Detectors 325a–b are each connected to feedback device 330 and provide signals indicative of the energy of the soliton pulses and of the detected energy of the dispersive-wave 205, respectively. While, the energy of the soliton pulses measured with detector 325a includes the energy of dispersive-wave 205, the energy measured by detector 325a may also be the energy of just the soliton pulses themselves. In any event, feedback device 330 compares the respective energy levels and determines the difference or a ratio between the energy level of the dispersive-wave to the energy level of the soliton pulses. This comparison, difference or ratio provides an advantageous indication of soliton-pulse transmission performance. In other words, comparing these energy levels gives an indication of the quality (or degradation) of soliton-pulse fidelity.

In an exemplary embodiment, feedback device 330 is a processing device such as a conventional microprocessor or conventional microcontroller. However, those skilled in the art will appreciate that feedback device 330 may also be implemented using discrete logical circuit components or analog control circuitry depending upon particular design and cost considerations in any embodiment of the present invention.

Once feedback device 330 has made the comparison and determined the indication of soliton-pulse transmission performance, this information may be advantageously provided back to control device 305 (or multiple control devices) as telemetry from a feedback output of feedback device 330. The information may be generally used by control device 305 to alter a characteristic of the soliton pulses. More particularly, the value of the feedback signal allows control device 305 to appropriately alter or optimize the transmission performance of the soliton pulses. For example, an optical amplifier with gain control, a pulse compressor/expander, or an adjustable dispersion compensator may accomplish this by altering one or a combination of a power level of the soliton pulses, a pulse shape of the soliton pulses, or a dispersion characteristic of the soliton pulses. Thus, such an optical transmission system 100 can be adaptive and robust to deal with varying or unknown values of fiber link dispersion, fiber loss, and fiber length. Furthermore, if more than one monitoring module 110 is desired within optical transmission system 100, those skilled in the art can appreciate that such multiple monitoring modules 110 as described herein would provide an additional level of adaptability and robustness to optical transmission system 100.

In another embodiment of the present invention, the feedback signal may be provided all the way back to soliton source 105 at a provisioning stage of the optical transmission system 100. In this way, soliton source 105 may also be considered a control device that alters characteristics of the soliton pulses in order to improve or optimize soliton-pulse transmission performance.

By providing the indication of soliton-pulse performance back to a control device, such as control device 305 or soliton source 105, the control device may be adjusted so that optical transmission system 100 operates just above an optimum transmission performance level for a fundamental soliton. In this manner, monitoring module 110 may detect and monitor a small but finite energy level associated with dispersive-wave 205. The dispersive wave's energy level may be large enough to detect and monitor using an embodiment of the present invention as described above, but not so large that the dispersive wave's energy substantially affects the soliton transmission performance.

FIG. 4 is a flow diagram illustrating exemplary steps from a method for monitoring transmission performance of soliton pulses consistent with an embodiment of the present invention. As shown in FIG. 4, the method 400 begins at step 405 where an energy level of the soliton pulses is measured. In the example illustrated in FIG. 3, detector 325a detects the energy level of the soliton pulses. In the exemplary embodiment, the detected energy level of the soliton pulses includes the average energy level of both the soliton pulses and the dispersive wave.

At step 410, the soliton pulses are applied to a gating device, such as gating device 315. Once the soliton pulses are applied to the gating device, dispersive-wave energy is essentially gated between adjacent soliton pulses in the pulse stream during step 415. In other words, the soliton pulses are gated to reveal or access a dispersive-wave between adjacent soliton pulses. Accessing the dispersive-wave is typically accomplished by triggering the gating device with a gating signal after one of the soliton pulses has passed but before the next soliton-pulse has arrived at the gating device. Once the gating signal is provided to the gating device, the gating device typically enters a "through" state and essentially allows the dispersive-wave "through" to be monitored. At step 420, the energy level of the dispersive-wave is monitored. Typically, the dispersive-wave energy is monitored using another detector 325b in combination with feedback device 330.

At step 425, the energy level of the dispersive-wave is compared to the energy level of the soliton pulses themselves. In this manner, the relative difference in energy levels or a ratio of the different energy levels indicates the transmission performance of the soliton pulses as they have propagated. The indication of soliton-pulse transmission performance is advantageous because it permits adaptation and handling of fiber links with unknown loss, dispersion, and length characteristics with an optical transmission system.

At step 430, a feedback signal is generated that relates to the indication of soliton-pulse transmission performance. More particularly stated, the value of the feedback signal represents the indication of transmission performance. Next, the feedback signal is provided as telemetry to a control device, such as control device 305 in FIG. 3, as described in step 435. By doing so, the control device can then complete the adaptive feedback loop and alter the soliton pulses to improve or optimize transmission performance as soliton pulses pass through the control device based upon the feedback signal (i.e., the indication of soliton-pulse transmission performance) at step 440.

In summary, an exemplary embodiment of the present invention is part of optical transmission system 100 and includes gating device 315, feedback device 330 and control device 305. Soliton pulses are received by gating device 315, which then detects and monitors a dispersive-wave 205 between adjacent soliton pulses 200 with the assistance of timing circuit 320. Essentially, timing circuit 320 provides a gating signal offset in phase (typically approximately 180 degrees offset in phase) from the soliton pulses incident to gating device 315 in order to trigger gating device 315. Triggering gating device 315 allows the dispersive-wave 205 to be accessed and monitored between adjacent soliton pulses 200. Feedback device 330, using detectors 325a–b and processing circuitry, measures the energy of the soliton pulses and the energy of dispersive-wave 205. Feedback device 330 then compares the relative energy levels or, more particularly stated, determines a ratio of the energy levels as an indication of soliton-pulse transmission performance. This indication is then fed back to control device 305 as a feedback signal in order for control device 305 to appropriately adjust characteristics of the soliton pulses and improve or optimize transmission performance.

It will be apparent to those skilled in the art that various modifications and variations can be made to the system and method of the present invention without departing from the spirit or scope of the invention. For example, the monitoring module depicted in the figures is intended to be exemplary of preferred embodiments. The precise gating and feedback structure may readily be altered by one of ordinary skill in the art to obtain the equivalent monitoring apparatus as disclosed herein without departing from the spirit or scope of this invention. The present invention covers the modifications and variations of this invention provided they come within the scope of the appended claims and their equivalents.

What is claimed is:

1. A method for monitoring transmission performance of a plurality of soliton pulses within an optical transmission system, comprising the steps of measuring an energy level of the soliton pulses;

accessing a dispersive-wave between adjacent ones of the soliton pulses;

monitoring an energy level of the dispersive wave; and comparing the energy level of the soliton pulses and the energy level of the dispersive-wave to provide an indication of the transmission performance of the soliton pulses.

2. The method of claim 1, wherein the step of measuring the energy level of the soliton pulses further comprises measuring an energy level of the soliton pulses incident to a first detector.

3. The method of claim 1, wherein the step of accessing further comprises gating the soliton pulses to reveal the dispersive-wave between the adjacent ones of the soliton pulses.

4. The method of claim 3, wherein the gating step further comprises:

provviding a gating signal to a gating device, the gating signal being offset in phase from each of the soliton pulses; and in response to the gating signal, allowing the dispersive-wave through the gating device.

5. The method of claim 4, wherein the monitoring step further comprises monitoring the energy level of the dispersive-wave as the dispersive-wave passes through the gating device.

6. The method of claim 1 further comprising providing a feedback signal related to the indication of the transmission performance.

7. The method of claim 6 further comprising altering a characteristic of the soliton pulses based upon a value of the feedback signal.

8. The method of claim 7, wherein the altering step further comprises altering a power level of the soliton pulses based upon the feedback signal.

9. The method of claim 7, wherein the altering step further comprises altering a dispersion characteristic of the soliton pulses based upon the feedback signal.

10. The method of claim 7, wherein the altering step further comprises altering a pulse shape of the soliton pulses based upon the feedback signal.

11. An apparatus for monitoring transmission performance of a plurality of soliton pulses within an optical transmission system, comprising:

a gating device having a pulse input for receiving the soliton pulses, the gating device being operative to detect a dispersive-wave between adjacent ones of the soliton pulses, the gating device further having a detected output for providing access to the detected dispersive wave;

a feedback device coupled to the detected output of the gating device, the feedback device providing a feedback signal on a feedback output of the feedback device, the feedback signal being indicative of the transmission performance of the soliton pulses; and a control device coupled to the feedback output of the feedback device and, in response to the feedback signal, being capable of altering a characteristic of the soliton pulses.

12. The apparatus of claim 11, wherein the feedback device further comprises:

a first detector for measuring the energy level of the soliton pulses;

a second detector connected to the detected output of the gating device, the second detector being operative to monitor the energy level of the detected dispersive wave; and a processing device connected to the first detector and the second detector, the processing device operative to generate the feedback signal and provide the feedback signal on the feedback output.

13. The apparatus of claim 11 further comprising a timing circuit connected to a timing input of the gating device, the timing circuit providing a gating signal to the timing input of the gating device in between the adjacent ones of the soliton pulses incident to the pulse input of the gating device.

14. The apparatus of claim 13, wherein the timing circuit further provides the gating signal offset in phase from each of the soliton pulses incident to the pulse input of the gating device.

15. The apparatus of claim 11, wherein the control device alters a power level of the soliton pulses in response to receiving the feedback signal.

16. The apparatus of claim 11, wherein the control device alters a dispersion level of the soliton pulses in response to receiving the feedback signal.

17. The apparatus of claim 11, wherein the control device alters a pulse shape of the soliton pulses in response to receiving the feedback signal.

18. An apparatus for monitoring transmission performance of a plurality of soliton pulses within an optical transmission system, comprising:

a gating device for detecting a dispersive-wave between adjacent ones of the soliton pulses;

a first detector optically connected to an input of the gating device, the first detector capable of measuring an energy level of the soliton pulses and the dispersive-wave incident to the gating device;

a second detector optically connected to a detected output of the gating device, the second detector capable of monitoring an energy level of the detected dispersive wave; and a processing device connected to the first detector and the second detector, the processing device operative to
determine a ratio of the energy level of the detected dispersive-wave to the energy level of the soliton pulses,
generate a feedback signal having a value based upon the ratio, and
provide the feedback signal as an indication of the transmission performance of the soliton pulses.

19. The apparatus of claim 18 further comprising a control device connected to the processing device for receiving the feedback signal and, in response to receiving the feedback signal, capable of altering a characteristic of the soliton pulses.

20. The apparatus of claim 19, wherein the control device alters a power level of the soliton pulses in response to receiving the feedback signal.

21. The apparatus of claim 19, wherein the control device alters a dispersion level of the soliton pulses in response to receiving the feedback signal.

22. The apparatus of claim 19, wherein the control device alters a pulse shape of the soliton pulses in response to receiving the feedback signal.

23. The apparatus of claim 18 further comprising a timing circuit for triggering the gating device with a gating signal in between the adjacent ones of the soliton pulses.

24. The apparatus of claim 23, wherein the timing circuit further provides the gating signal offset from the adjacent ones of the soliton pulses.

* * * * *